April 15, 1941.　　　H. W. BATTLE, JR　　　2,238,674
COLOR MATCHING DEVICE
Filed Aug. 15, 1939
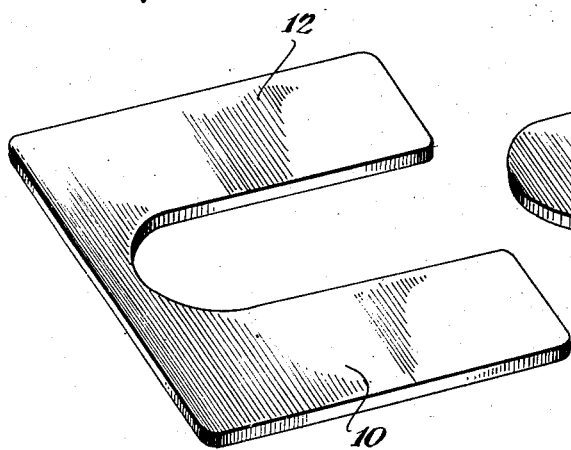
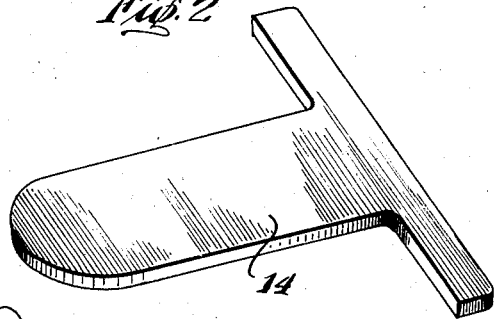
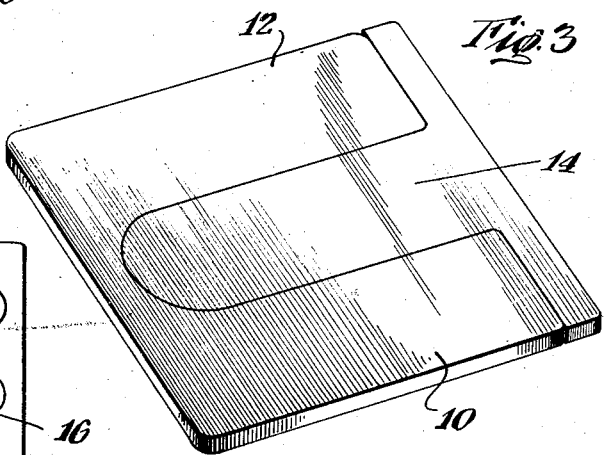
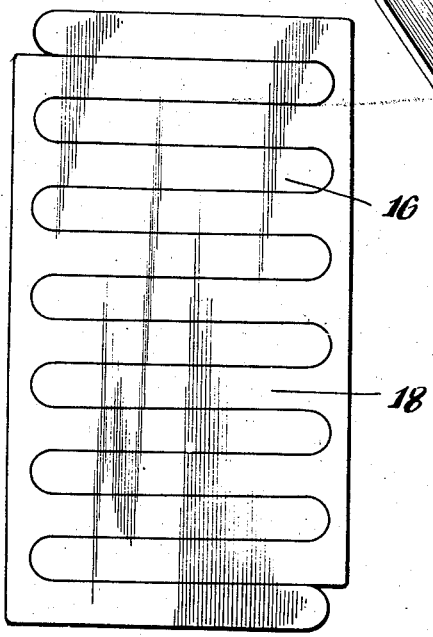
INVENTOR
Henry W. Battle, Jr.
BY
Alan M. Mann
his ATTORNEY Patented Apr. 15, 1941

2,238,674

UNITED STATES PATENT OFFICE 2,238,674

COLOR MATCHING DEVICE

Henry W. Battle, Jr., Louisville, Ky., assignor to Devoe & Raynolds Co., Inc., a corporation of New York Application August 15, 1939, Serial No. 290,185

3 Claims. (Cl. 88—14)

In the paint industry the matching of colors has long been a troublesome problem and even today workers in the art do not have a satisfactory device for spotting colors which appear to match but which do not, in fact, match when viewed from different vantage points or under different lights. Ordinarily, paint workers match colors by comparing two slabs, one painted with the color to be matched and the other painted with the matching color. The two slabs are placed side by side and compared in different positions and at different angles. This is a simple method but it is exceedingly difficult to match colors accurately in this manner because a slight difference in the light cast on different parts of the color surface of either slab may make the colors appear differently from what they actually are and, consequently, mislead the worker in his comparison of the colors. Workers in the art find that such a method is frequently misleading and that colors which appear to match perfectly by this test actually may show perceptible differences when compared under different conditions.

When two color specimens are compared in this manner the eye cannot travel continuously in one direction along a straight line as it compares one color with the other. The eye is focused first on one color and then on the other color. Then the eye is again focused back to the first color. By repeating this process a number of times, focusing first to one color and then to another color and then back again to the first color, the eye attempts to discern differences between the two colors; but I find that the eye is not comparing the same parts of the color specimens but different parts which may be subject to different light conditions. For example, as the eye is focused back and forth it follows a zig-zag pattern from one color specimen to the other and does not return to exactly the same point from which it started. When the eye follows such a zig-zag pattern the specimens may appear differently at each point, depending upon the light and the inclination of the color specimen at the moment the eye is focused on it. Certainly, we know that the eye is often deceived as it attempts to compare colors and I have found that a large percentage of these inaccuracies is apparently owing to the zig-zag pattern followed by the eye as it compares one color with the other.

Based upon my observations, I have invented a device for matching colors which permits the worker to contrast color specimens several times without causing the eye to deviate from a focus along a straight line.

The structure of my invention consists essentially of two members having mutually engaging projections and notches. Each member is arranged so that it has alternate projections and notches; and ordinarily one of the members has at least one less projection than the other member. The alternate projections and notches in each member are arranged so that they fit into the alternate notches and projections of the other member. Preferably, my device consists of a flat piece of wood, cardboard or the like, and each member of the device consists almost wholly of elongated projections of a given area separated by corresponding recesses of substantially equal area. The surface of one member is coated with a color to be matched and the surface of the other member is coated with the matching color. The two members are then fitted together and care should be taken that the coated surfaces of both members lie in substantially the same plane. The coated surface formed when the members are fitted together will then consist of alternate patches of the matching color and the color to be matched. The device may then be held up to different lights and in different positions and the colors compared. The eye can then travel transversely across the interlocking projections of the device, passing over different patches of the two colors in a straight line. In that way, the eye follows a straight line continuously across the coated surface and as it is focused along this line, it can compare and contrast the matching color with the color to be matched. Such a device eliminates constant refocusing of the eye and permits the eye to compare colors under the most favorable conditions.

I find that very accurate results are obtained with my device if four or five alternate pairs of interlocking projections are coated with the two colors; but satisfactory results are obtained when two pairs of projections are coated with one color and a single projection coated with another color and inserted between the other projections. I have found, moreover, that the best results are obtained when the coated area covered by each color is substantially equal to the coated area covered by the other color. Naturally, the greater the number of contrasting patches which the eye can compare as it is focused in a straight line transversely across the projections, the greater the accuracy of the device. I have also found that it is desirable to check on the results of one device by using another device, coated with the same colors, by having projections of different width from the projections of the first device.

Projections having slightly tapering terminal ends are to be preferred in that they fit easily into the corresponding notches of the other part of the device and also permit both members to be readily adjusted so that the coated surfaces of both members lie in the same plane. However, I have used projections of various configurations and it is sometimes desirable to have the configuration of each projection in a device different from other projections. Moreover, for some purposes I have found that it is advisable to have the width of the adjoining projections progressively less. However, such variations are too costly for ordinary purposes.

The device of my invention is illustrated in the accompanying drawing:

Figs. 1 and 2 are perspective views of my device and show the projections and notches of both members before they are interlocked;

Fig. 3 is a perspective view and shows the projections and notches of Figs. 1 and 2 in interlocking position; and Fig. 4 is a top plan view of a variant of my device showing a plurality of interlocking projections and notches of relatively narrow width.

The numerals 10 and 12 indicate the projections of one member and 14 indicates the projection of the corresponding member of the device of my invention. In Fig. 4, 16 indicates the projections of one member of the device and 18 indicates the projections of the other member of the device. The projections are interlocked as shown in the drawing and the colors are contrasted by having the eye focused in a continuous and substantially straight line transversely across the interlocking tongues.

I claim:

1. A device for matching colors comprising two interfitting members adapted to form a flat surface when fitted together, the surface of one member being coated with a coating composition of a standard color and the surface of the other member being uncoated but adapted to receive a coating composition whose color is to be compared with the standard color on the other member, one of the said members comprising at least two elongated, tongue-like projections extending outwardly in the same direction, said projections being separated by a notch, and the other of said members comprising an elongated, tongue-like projection corresponding to the notch of the first member and having spaces corresponding to the projections of the first member.

2. A structure as specified in claim 1 in which the projections of each member are of the same shape and of substantially the same area.

3. A structure as specified in claim 1 in which the second member has at least one less projection than the first member.

HENRY W. BATTLE, Jr.